United States Patent
Ballantyne (10) Patent No.: US 8,441,484 B2
(45) Date of Patent: May 14, 2013

(54) NETWORK TROUBLE-TICKETS DISPLAYED AS DYNAMIC MULTI-DIMENSIONAL GRAPH

(75) Inventor: Andrew John Ballantyne, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1023 days.

(21) Appl. No.: 11/849,819

(22) Filed: Sep. 4, 2007

(65) Prior Publication Data

US 2009/0058857 A1    Mar. 5, 2009

(51) Int. Cl.
*G06T 11/20* (2006.01)
(52) U.S. Cl.
USPC ............................................................ 345/440
(58) Field of Classification Search .................. 345/440; 709/224
See application file for complete search history.

(56) References Cited

U.S. PATENT DOCUMENTS

| | | | | |
|---|---|---|---|---|
| 5,764,913 | A | * | 6/1998 | Jancke et al. ................. 709/224 |
| 5,805,166 | A | * | 9/1998 | Hall et al. ..................... 715/839 |
| 6,259,458 | B1 | * | 7/2001 | Theisen et al. ................ 345/440 |
| 6,906,709 | B1 | * | 6/2005 | Larkin et al. .................. 345/419 |
| 2003/0011601 | A1 | * | 1/2003 | Itoh et al. ...................... 345/440 |
| 2003/0126255 | A1 | * | 7/2003 | Rice et al. ..................... 709/224 |
| 2004/0150644 | A1 | * | 8/2004 | Kincaid et al. ................ 345/440 |
| 2005/0180330 | A1 | * | 8/2005 | Shapiro ......................... 370/241 |
| 2006/0021034 | A1 | * | 1/2006 | Cook ............................... 726/22 |
| 2007/0209074 | A1 | * | 9/2007 | Coffman ......................... 726/23 |

OTHER PUBLICATIONS

Zeng et al., Computation of Adalines' Sensitivity to Weight Perturbation, IEEE Transactions on Neural Networks, vol. 17, No. 2, pp. 515-519, Mar. 2006.*

* cited by examiner

*Primary Examiner* — Xiao M. Wu
*Assistant Examiner* — Charles Tseng
(74) *Attorney, Agent, or Firm* — Patterson & Sheridan, LLP (57) ABSTRACT

In one embodiment, a technique for efficient display of trouble ticket information is provided. The technique involves presenting a single view of disparate sets of data as a multi-dimensional graph. A weighting function may be applied to branches of the graph and the graph updated to reflect the results of application of the weighting function.

23 Claims, 8 Drawing Sheets

NETWORK TROUBLE-TICKETS DISPLAYED AS DYNAMIC MULTI-DIMENSIONAL GRAPH

TECHNICAL FIELD

The present disclosure relates generally to network traffic management.

BACKGROUND

Troubleshooting a network problem is often a difficult task. Often, network engineers or other support staff may have to contact a technical assistance center for help in troubleshooting and/or fixing a problem. The reporting of a problem to a network assistance center may result in the creation of a mechanism used to document and track the problem, commonly referred to as a trouble ticket. Trouble tickets are often presented to staff of the technical assistance center via a graphical user interface (GUI) that allows the staff to view a brief description and other data relevant to the problem.

Trouble tickets often contain disparate sets of data, for example, including raw network alarms, impact analysis data, and diagnostic analysis output. Conventionally, these different sets of data are displayed in separate tabs. Unfortunately, this approach suffers from a number of drawbacks. As an example, it is often difficult for a user to identify correlations between all the data, due to the fact that switching to a different tab means data from the previous tab is removed from sight (e.g., the user is unable to view the alarm data at the same time as the diagnostic data). As another example, while the trouble ticket data is dynamic, it is not typically possible for the user to see the data changing in real time (e.g., as more alarms are received and/or analysis data is generated).

Accordingly, what is needed is a technique for effectively presenting trouble ticket data.

DESCRIPTION OF EXAMPLE EMBODIMENTS

Embodiments of the present invention allow for the effective display of trouble-ticket data via a multi-dimensional (e.g., 2-D or 3-D) graph, for example, provided in a GUI that is part of a network management system (NMS). The trouble ticket initiation and reporting may be performed using conventional techniques. However, the multi-dimensional graph may be dynamically updated to reflect changes in data correlated to a single trouble-ticket (or set of trouble tickets) as new data arrives.

For some embodiments, the graph may include branches corresponding to data sets of disparate data (e.g., network alarms, impact analysis, diagnostic output, and root cause) which may be expanded or collapsed to show or hide views of individual items in the sets. Information presented in the graph may originate from the network itself (e.g., as the result of polling or via a trap generated by a network deployed probe) or may originate from a network management system (e.g., as a result of diagnostic operations performed on data received from the network).

For some embodiments, weighting functions may also be applied to alter the display based on the amount of data in any particular set, for example, to provide an indication of a data set that has changed or that has reached a particular threshold volume of data relative to other data sets. A variety of other mechanisms may also be used to indicate changes, such as reference numbers or last-change dates.

As used herein, the term trouble ticket generally refers to a mechanism used in an organization to track the detection, reporting, and/or diagnosis of a problem. Trouble ticketing systems may be used in a variety of customer-service related environments, such as a network operation center (NOC). Embodiments of the present invention will be described with reference to network trouble tickets as a concrete, but not limiting application example. However, those skilled in the art will recognize that the concepts presented herein may be applied in a variety of different environments to efficiently display disparate data sets.

Such large volumes of data may arrive over the space of several minutes or hours. Further, as faults are corrected, alarms will be cleared. Therefore, trouble ticket data is highly dynamic. Typically at a final stage, impact analysis data will also clear as faults are corrected.

An Exemplary Network Architecture

Figure 1:
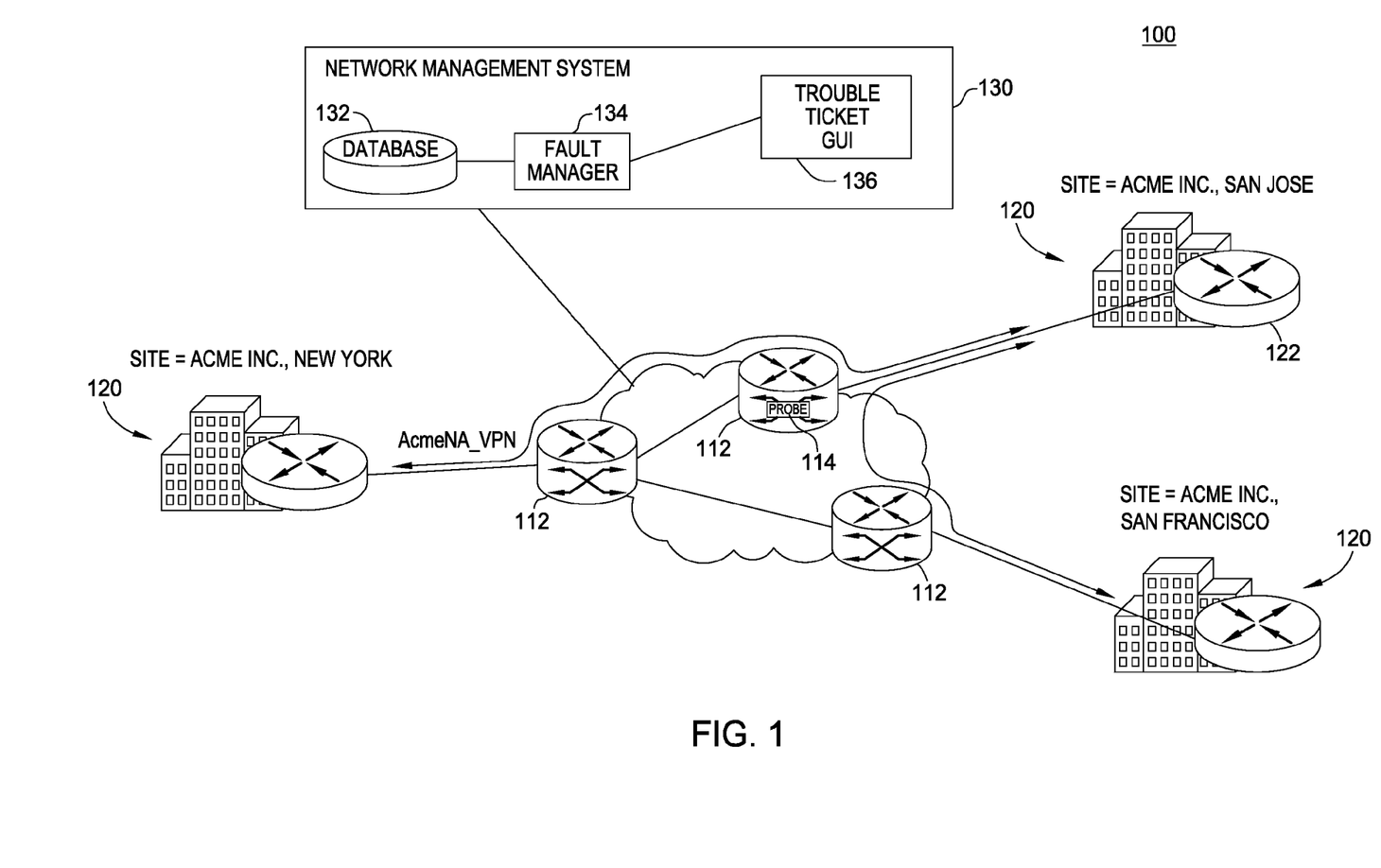
FIG. 1 illustrates an example network topology in accordance with embodiments of the present invention.

FIG. 1 illustrates one example of a network architecture in which embodiments of the present invention may be utilized. The network generally includes a service provider network 110 that routes network traffic (e.g., of data, voice, and the like) between various customer sites 120. As illustrated, the customer sites 120 may connect to the service provider network 110 via customer edge (CE) routers 122 connected to provider edge (PE) routers 112 that are part of the provider network 110. While not shown, those skilled in the art will appreciate that the provider network 110 may also include a "fabric" of intermediate network devices, such as switches and routers that route and support traffic between the PE routers 112.

For some embodiments, the service provider network 110 may be a Multiprotocol Label Switching (MPLS) network that forwards internet protocol (IP) traffic using labels. These labels may instruct the routers and the switches in the provider network 110 where to forward packets as they are routed between PE routers 112 en route to CEs 122 at the customer sites 120 based on pre-established IP routing information.

The sites 120 may include sites from different business entities, as well as multiple sites from the same business entity (e.g., regional branch offices and headquarters). In the illustrated example, multiple sites for a first hypothetical business entity "Acme, Inc." and a single site for a second hypothetical business entity "Another, Inc." are shown.

In order to provide secure communications between sites, virtual private networks (VPNs) may be established, for example when routing traffic between sites within the same business entity over the provider network 110. VPNs enable IP traffic to be routed securely over the provider network 110 by preventing the communication of data between sites that are not part of the same VPN. In FIG. 1, two VPN connections are shown: "AcmeNA_VPN" established between New York and San Jose Acme sites of Acme, Inc. and "AcmeSJ_AnotherSF_VPN" established between the San Jose site of Acme and the San Francisco site of Another, Inc.

A network management system (NMS) 130 may be configured to monitor performance of the provider network 110, as traffic is exchanged over the VPNs. The NMS 130 may be implemented, for example, at a network operation center (NOC) and may communicate with agents deployed in the provider network in an effort to help track network performance and the general health of network resources.

For example, a network probe 114 may be deployed in the network to actively generate and monitor network traffic to gather information indicative of network performance. The network probe 114 may be implemented on an existing network device, such as a PE router 112, as shown, or in dedicated devices. The traffic generated may be designed to travel the same path as other traffic on various VPN connections. Thus, the connectivity of specific portions of a VPN routing and MPLS switching path, such as PE-to-PE connections and/or PE-to-CE connections, may be monitored.

Results of probe operations may be kept internally and accessed by the NMS 130 via polling, for example, using information about the device contained in a Management Information Base (MIB) Database. Alternatively, the probe 114 may be configured to automatically send a network trap (alarm) to the NMS 130, upon detection of a significant event, such as a loss in connectivity or the reduction in service level above or below specified threshold amount.

Regardless of how the results are obtained, a fault management function (Fault Manager) 134 of the NMS 130 may be configured to display fault information, which may be associated with and/or reported as a trouble ticket. As illustrated, the Fault Manager 134 may include a trouble ticket graphical user interface (GUI) 136, which may be configured to display disparate sets of information related to a common trouble ticket. For some embodiments, the GUI 136 may present a multi-dimensional graph to a user that has multiple branches, each corresponding to a different set of data. As a result, the user may be able to view a wide variety of data related to a trouble ticket of interest in a single view without having to toggle through multiple "tabs" of data.

Multi-Dimensional Display of Trouble Ticket Data

Figure 2A:
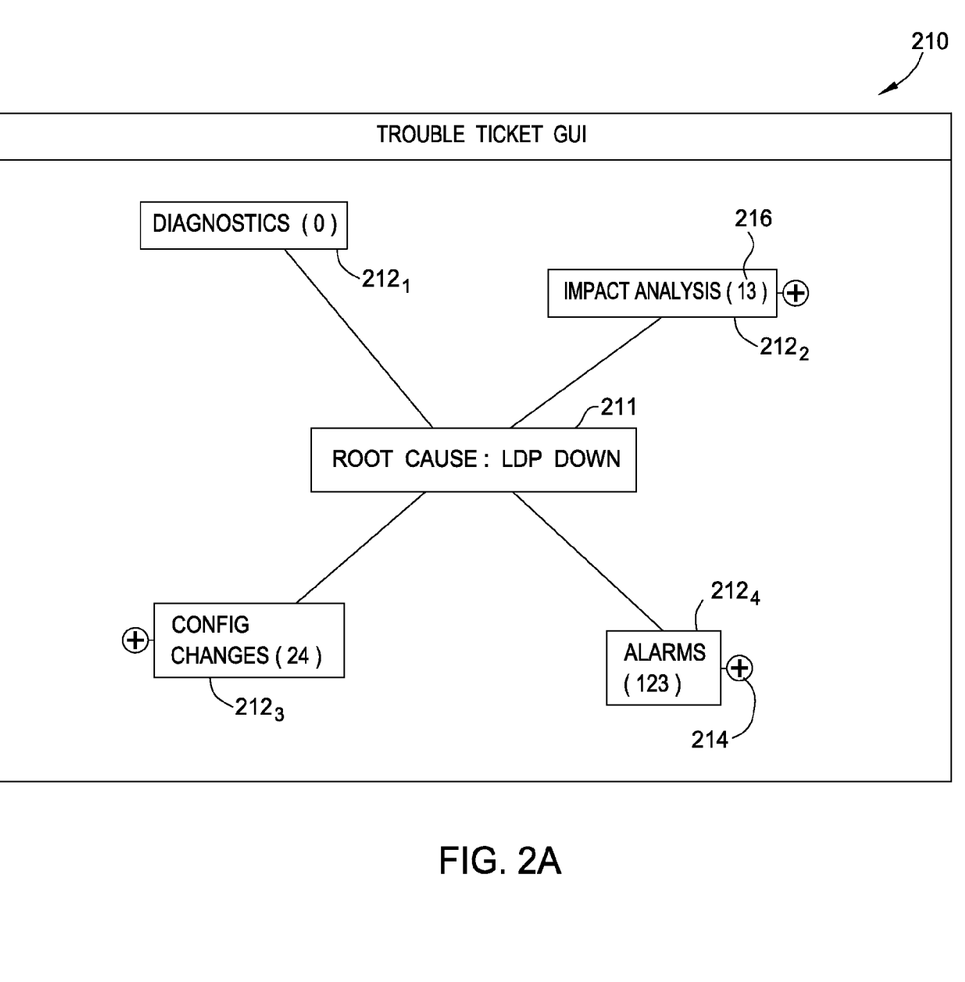
FIGS. 2A and 2B illustrate example trouble ticket graphical user interfaces (GUIs) in accordance with embodiments of the present invention.
Figure 2B:
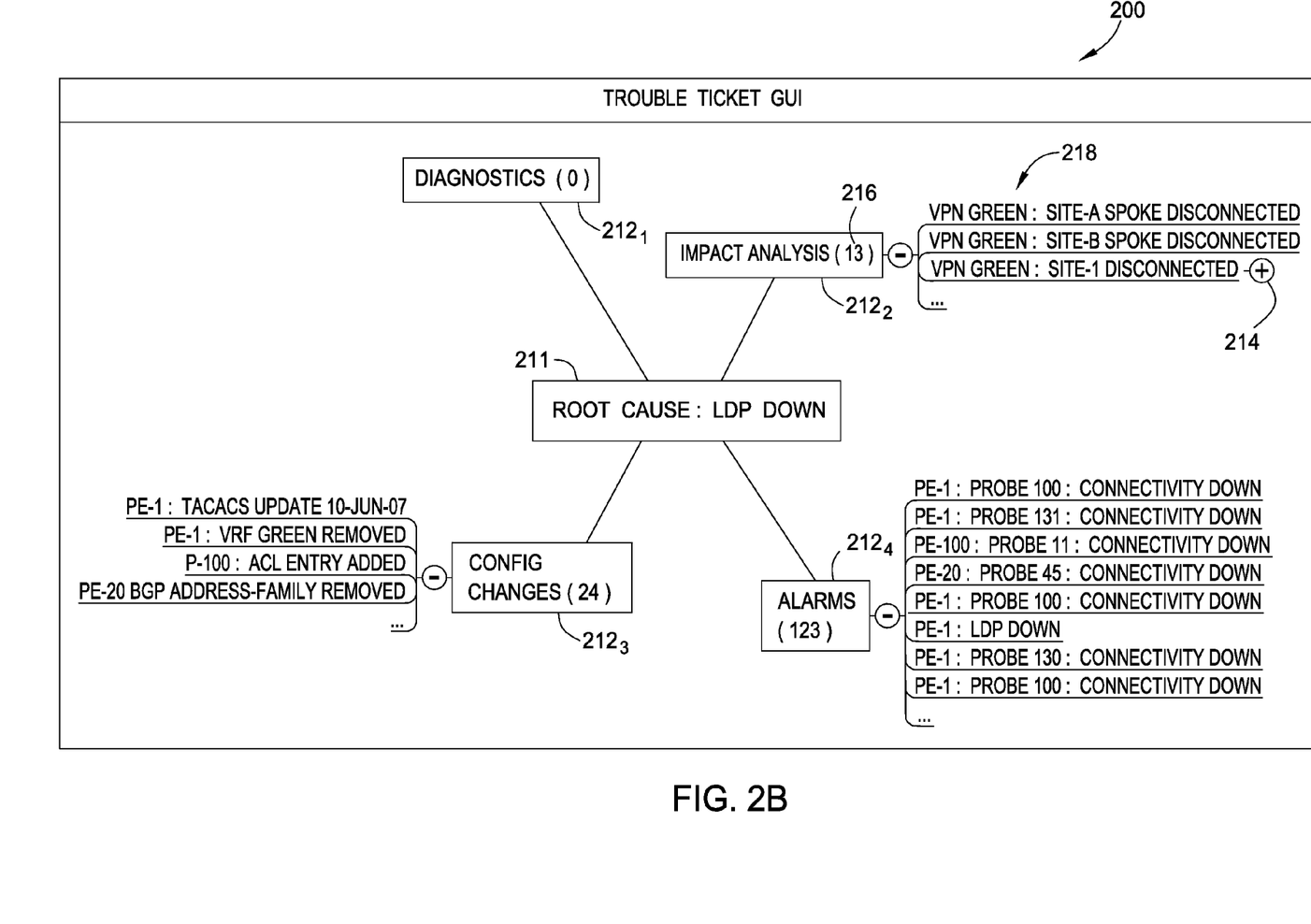

FIGS. 2A and 2B illustrate an example trouble ticket graphical user interface (GUI) 200 with a 2-D graph 210 for displaying trouble ticket information, in accordance with embodiments of the present invention. Of note, one embodiment of the invention capable of generating such a GUI is implemented as executable software embodied in one or more non-transitory computer-readable media. As illustrated, the graph 210 may include separate elements (e.g., branches 212) for a variety of different sets of data.

For illustrative purposes, separate branches 212 for Network Alarms, Diagnostics, Impact Analysis, and a history of Configuration Changes are shown. For some embodiments, a user (e.g., administrator) may be able to select the number and types of data sets to be displayed as branches 212 and/or the location on the graph 210 in which they appear. Such selection may be provided, for example, via a Setup/Configuration screen accessible via the GUI 200.

The Alarm branch may display alarms detected through the use of polling or, for some embodiments, alarms reported from network-deployed probes. More conventional network traps may also be sent from network elements. The Impact Analysis branch may display a list of entities, connections, sites, and the like, that are affected by a problem related to a trouble ticket.

The Diagnostic branch may include a list of test results, and possible approaches to solve a problem. For some embodiments, users may be presented with software tools allowing the users to initiate diagnostic operations. Such tools may perform a series of tests and may follow different diagnostic paths depending on the test results. As a result, the Diagnostic branch may include test results and/or the progress of tests.

The Configuration Changes branch may provide valuable insight into a problem, for example, by listing a log of changes made to the configuration of various routers of interest in the network. For example, a change in an access control list (ACL) may inadvertently cause a fault.

For some embodiments, a user may be able to specify and/or change the location of a branch 212 by dragging and dropping a branch to the desired location. If the branch is dragged to a location occupied by another branch, the GUI 200 may automatically adjust the location of the other branch and/or one or more other branches.

For some embodiments, a user may be able to control the level of detail of information displayed for one or more of the branches 212. For example, FIG. 2A illustrates the graph 210 in a fully collapsed state, with expanded information for each branch 212 hidden. The existence of expanded information may be indicated by some type of icon 214 (illustratively a "+"). The volume of expanded items may also be indicated by a separate indication 216, which may be useful to a user considering whether to expand a corresponding branch 212.

In the illustrated example, the indication 216 shows there are three items under the Impact Analysis branch. FIG. 2B illustrates the graph 210 in a partially expanded state, with all but the Configuration Changes branch 212 expanded. As illustrated, the three items of the Impact Analysis branch 212 correspond to VPN connections that have been determined to be impacted by a problem related to the corresponding trouble ticket. As illustrated by the additional icon 214 next to each identified impacted VPN connection, still more expanded information is available, for example, with details of each corresponding VPN (e.g., end point sites, VPN type, Source and Destination IP addresses, and the like). As an alternative, or in addition to, expanding the graph, such information may also be provided as "flyover text" displayed when the user places a mouse cursor over an impacted VPN.

For some embodiments, the graph 210 may be dynamically updated to reflect updates in information (e.g., new information, changes, or deletions) for one or more of the branches 212. In contrast, in conventional "tabbed view" displays, changing information might only be displayed in a currently selected tab, forcing a user to select each tab separately to check for updates in information. The changing information may be indicated in the graph 210 in a number of ways. For example, the volume indication 216 may be updated to indicate new items. Further, changes in information for a branch 212 may be indicated by some other manner designed to draw attention, such as highlighting, changing color, changing size, changing font, or some combination of these.

For some embodiments, an indication may be provided that certain information is not presently available. For example, a fault management system may take some time to process data and run tests in order to accurately diagnose a Root Cause. While the determination is being made, an indication may be made in a Root Cause body 211, for example, by displaying a status bar showing the progress of the tests (e.g., and a percentage of completion). In addition or as alternatives, a series of question marks, an hourglass, or some other indication may be provided that information is being generated or gathered. Such indication may also be given for any of the branches, for example, as Impact Analysis is being performed to determine impacted VPN connections or while specific tests are being run, the results of which will be displayed in the Diagnostics branch.

For some embodiments, some type of weighting function may be applied to adjust some portion of a multi-dimensional graph. For example, such a weighing function may be designed to "place more weight" on graph branches 212 that have a particularly large volume of data (e.g., above a volume threshold specified for that branch) or if a particular rule or set of criteria has been met (e.g., a particularly important VPN connection or site has been impacted). The graph may be updated in a manner designed to draw attention to branches more heavily weighted in this manner. For example, branches with more data may be re-positioned towards the bottom of the graph.

Figure 3:
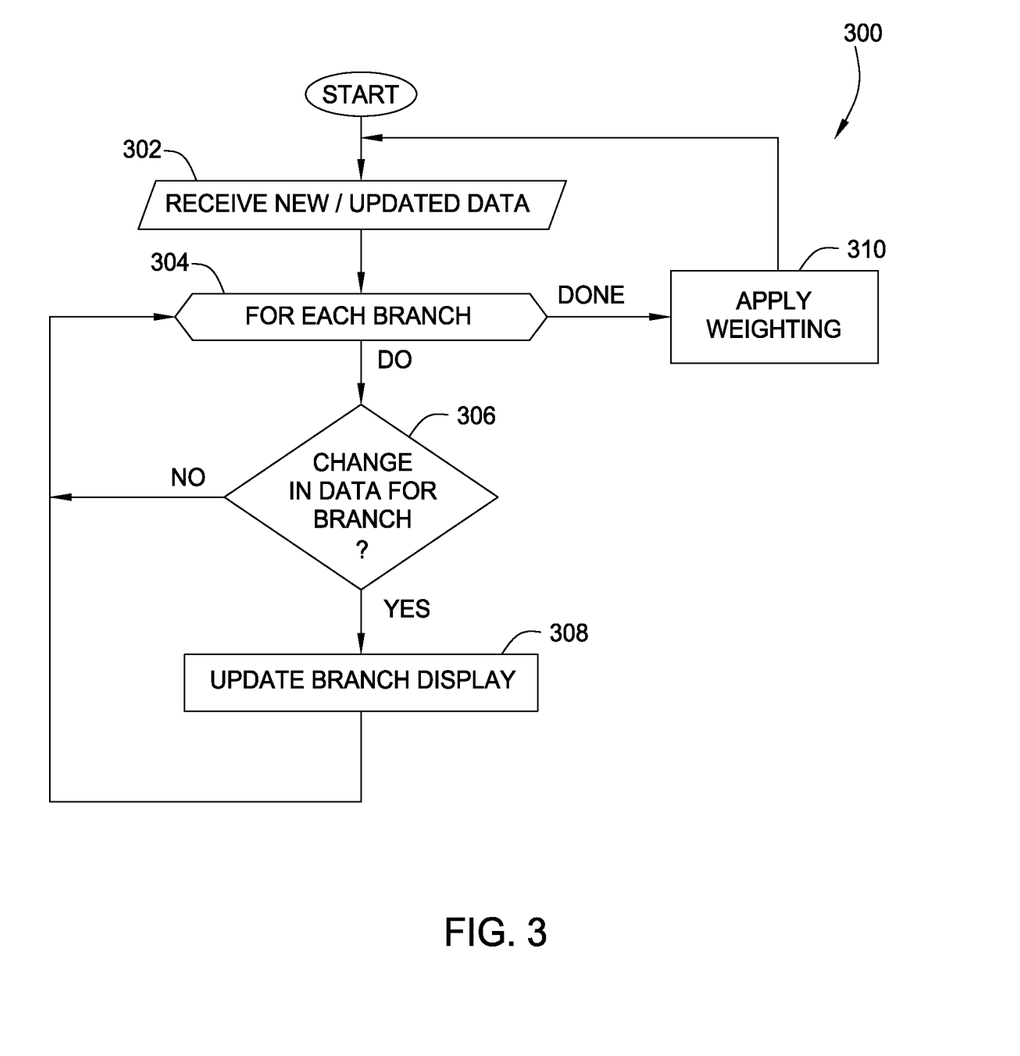
FIG. 3 is a flow diagram of example operations in accordance with embodiments of the present invention.

FIG. 3 is a flow diagram of example operations 300 that may be used to dynamically update a multi-dimensional trouble ticket graph and apply a weighting function, in accordance with embodiments of the present invention. The operations 300 begin, at step 302, when new and/or updated data corresponding to a trouble ticket is received.

The information may include information received from the network itself, for example, from a network deployed probe sending a trap. The information may also include information generated at a network management system, such as diagnostic information or the results of impact analysis identifying affected sites. For some embodiments, network deployed probes may be provisioned to send impact analysis information to the NMS in conjunction with reporting a fault trap.

At step 304, a loop of operations is entered, to be performed to update each branch. At step 306, a determination is made as to whether the updated data, received at step 302, involves a change in data for a selected branch. If not, the operations return to step 304 to examine the next branch. If the updated data does involve a change in data for the selected branch, that branch is updated, at step 308, to reflect the change.

Once all of the branches have been updated, a weighting function is applied, at step 310. As described above, the weighting function may take into consideration a volume of data of a branch relative to other branches or may apply a set of criteria or rules. In response to determining a particular branch should be weighted more (e.g., a particular condition is met), the multi-dimensional graph may be updated accordingly.

Figure 4A:
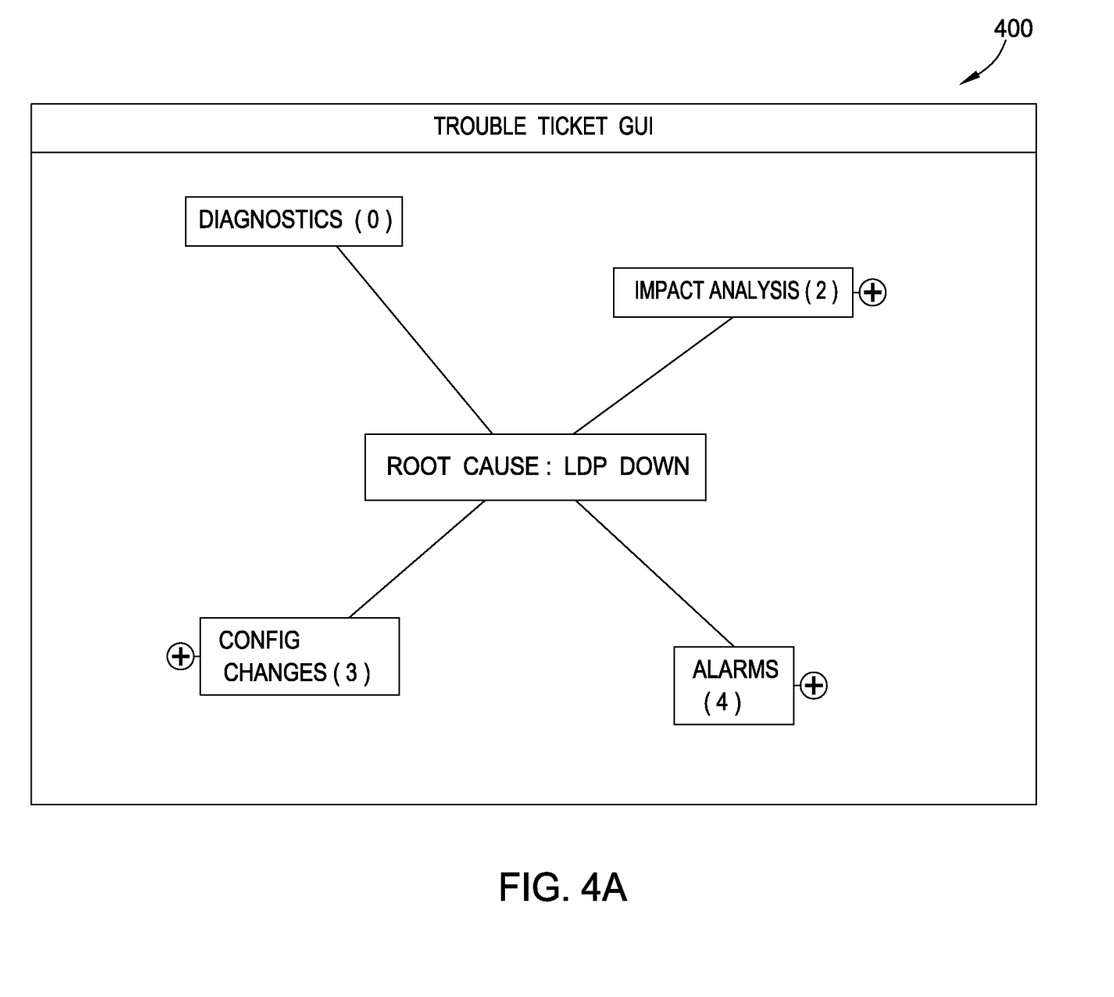
FIGS. 4A and 4B illustrate an example trouble ticket graphical user interface (GUI) in accordance with embodiments of the present invention.
Figure 4B:
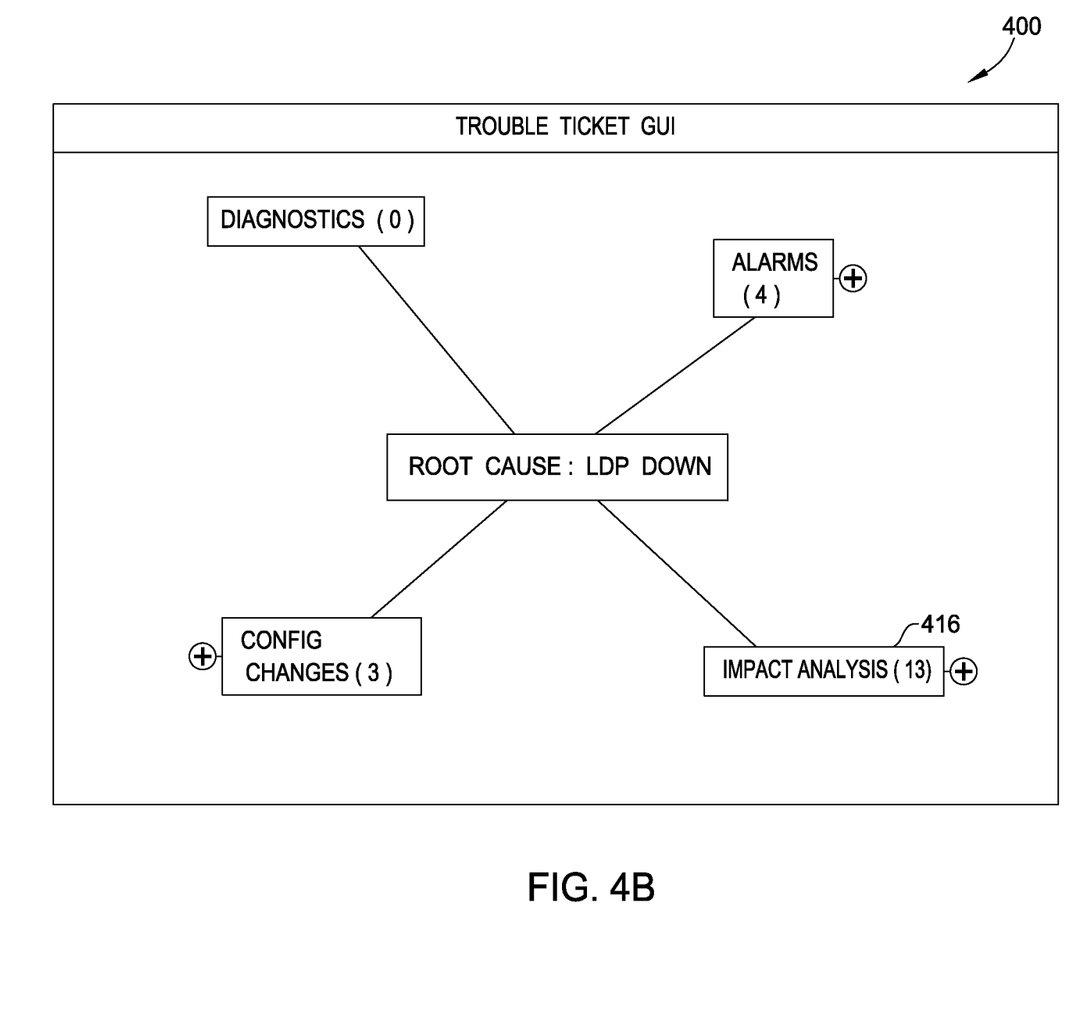

For some embodiments, a graph may be updated to show more heavily weighted branches lower (e.g., analogous to the manner in which heavily weighted tree branches would hang lower than others), as illustrated in FIGS. 4A and 4B, where the location of branches may be changed based on weighting. In FIG. 4A, the Impact Analysis branch has two items (e.g., indicating only two VPN connections have been affected by a problem correlated with a trouble ticket) and the Impact Analysis branch is on top. In FIG. 4B, two additional items are added to the Impact Analysis, bringing the total up to four. As a result, the Impact Analysis branch is moved to the bottom of the graph in FIG. 4B. Such a weighting function may simply compare the number of data items to an absolute threshold value. As an alternative, each branch may have a different threshold value and the branch or branches that have a higher number of items relative to their corresponding threshold may be moved lower. For some embodiments, a user may be able to adjust a threshold for each branch and/or may be able to specify whether more heavily weighted branches are placed lower or higher in the graph.

Figure 5:
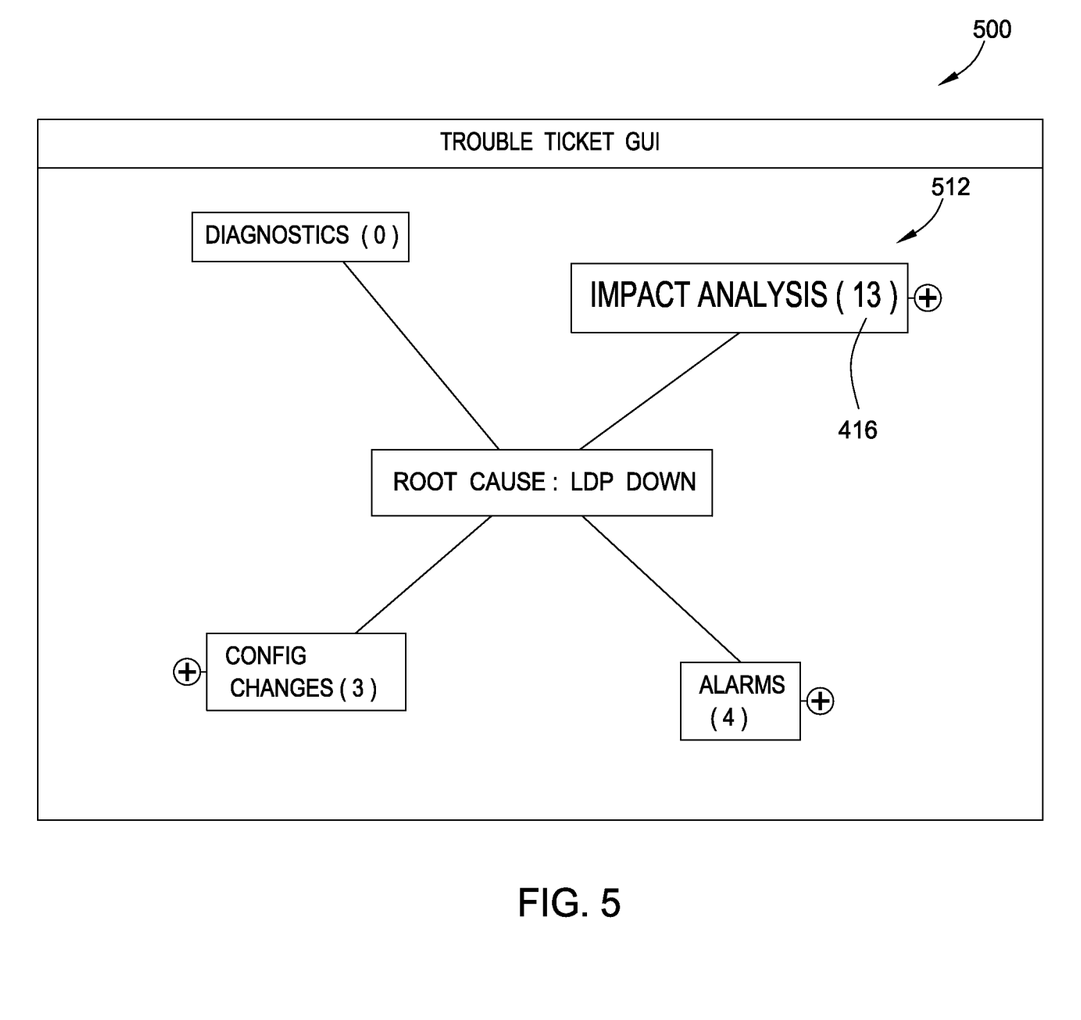
FIG. 5 illustrates examples of how portions of a multi-dimensional graph used in a trouble ticket GUI may be weighted in accordance with embodiments of the present invention.

As an alternative to, or in addition to, changing the relative location of branches based on weight, the relative size of the branch in the display may also be varied. For example, as illustrated in the screenshot 500 shown in FIG. 5, upon reaching/exceeding a threshold value of data items, the size of the Impact Analysis branch 512 in the graph may be increased substantially relative to other branches. Depending on the embodiment, the increase may be proportional to the number of items.

Figure 6:
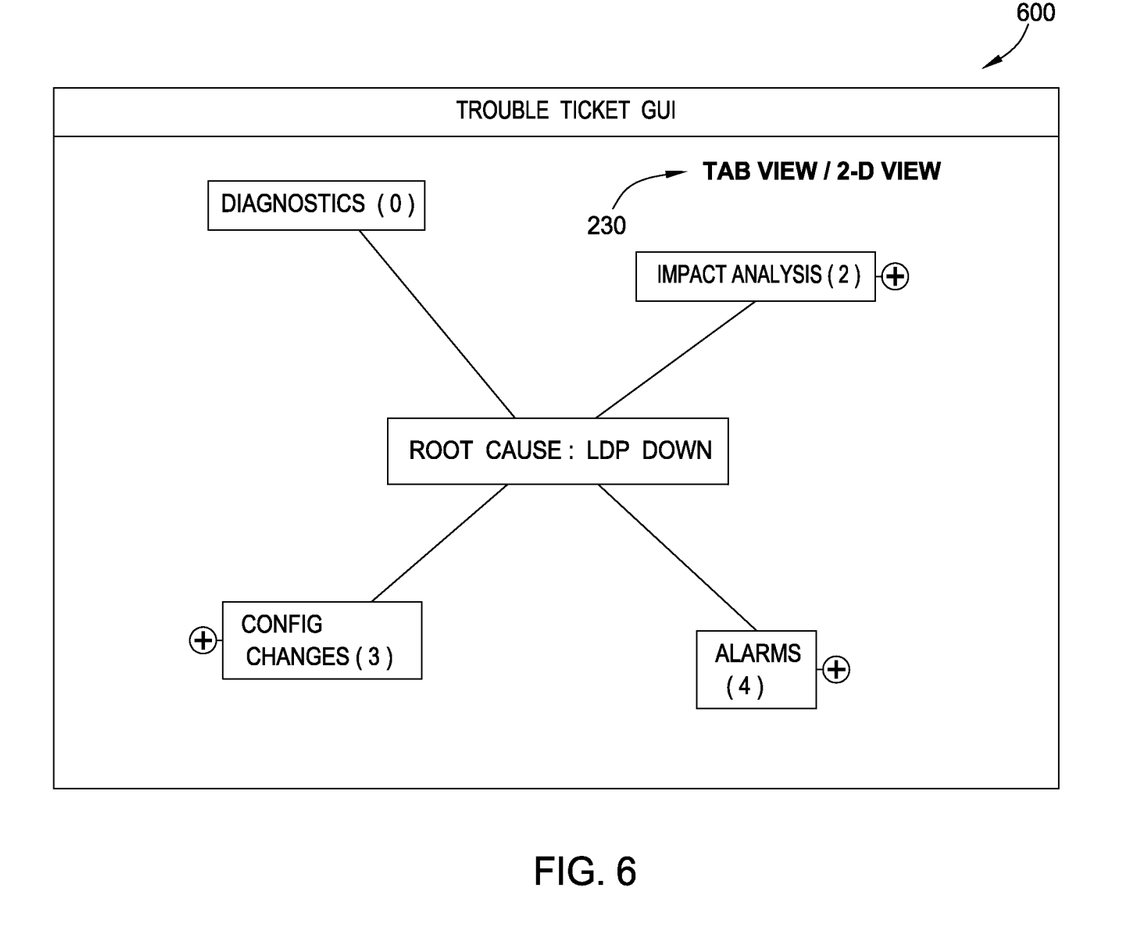
FIG. 6 illustrates an example trouble ticket graphical user interface (GUI) allowing a user to view trouble ticket information in either a tabbed view or multi-dimensional view in accordance with embodiments of the present invention.

While a multi-dimension graph provides a user with a single view of disparate sets of data, it may be desirable to have the option of focusing on a single set of interest. Therefore, for some embodiments, a user may be able to select a more conventional tabbed view of trouble ticket information. For some embodiments, as illustrated in the screenshot 600 shown in FIG. 6, a user may be able to toggle between a Tab View and a multi-dimensional view, via a selection area 230. One portion of the selection 230 may be disabled (e.g., grayed out) when the corresponding view is selected, allowing only the other view to be selected.

While the foregoing is directed to embodiments of the present invention, other and further embodiments of the invention may be devised without departing from the basic scope thereof, and the scope thereof is determined by the claims that follow.

What is claimed is:

1. A method comprising:
receiving data related to a problem reported for a network, the data including at least two different categories of data;
displaying representations of the at least two different categories of data as a multi-dimensional graph in a single screen of a graphical user interface, wherein each of the categories of data is represented in the multi-dimensional graph by a respective branch, wherein each branch is given a respective weight based, at least in part, on a number of data elements within the category associated with the branch, wherein the respective weight given to each of the branches is further based on a determination of whether the number of data elements exceeds a predefined threshold amount of data elements corresponding to the category associated with the branch, such that the respective weight of each branch is further increased if the corresponding predefined threshold amount of data elements is exceeded, and wherein the branches are positioned in a vertical hierarchy within the multi-dimensional graph relative to one other based on the respective weight for each branch, such that the greater the respective weight, the lower the relative position of the branch; and
updating the multi-dimensional graph to reflect changes in the data, wherein the position of at least one of the branches is altered so as to convey an updated relative importance of the branch, based on an updated weight for the branch, the updated weight based on an updated number of data elements within the category associated with the branch.

2. The method of claim 1, wherein displaying the two different categories of data as a multi-dimensional graph comprises:
displaying a representation of data of a first category as a first branch portion of the graph; and displaying a representation of data of a second category as a second branch portion of the graph.

3. The method of claim 1, further comprising:
adjusting a size of one or more attributes of a first one of the branches in the multi-dimensional graph, based on the amount of data in the corresponding category, wherein the size of the first branch is further based on a determination of whether the number of data elements within a first category of the at least two different categories of data associated with the first branch exceeds a respective predefined threshold amount of data elements corresponding to the first category, such that the first branch is displayed at an enlarged size if the corresponding predefined threshold amount of data elements is exceeded.

4. The method of claim 1, wherein receiving data related to a problem reported for a network comprises:
receiving data from one or more probes deployed on one or more devices in the network.

5. The method of claim 4, wherein at least one of the categories of data comprises impact analysis data.

6. The method of claim 1, wherein displaying representations of the two different categories of data comprises:
displaying an indication of a number of data elements in at least one of the categories; and
allowing expansion of a category to display a plurality of the data elements in the at least one of the categories.

7. The method of claim 1, further comprising:
allowing a user to toggle between a view of the data as the multi-dimensional graph in a single screen and a tabbed view with categories of data displayed in separate tabs.

8. The method of claim 1, wherein the respective weight is further based on the category associated with the branch, so that each branch is positioned relative to the other branches in the multi-dimensional graph according to their respective weight based on the category associated with the branch and the number of data elements within the category associated with the branch.

9. The method of claim 1, wherein the at least two different categories of data include, at least in part, a Network Alarms category, a Diagnostics category, an Impact Analysis category, and a History of Configuration Changes category, wherein the Network Alarms category includes alarms detected through at least one of the use of polling and alarms reported from network-deployed probes, wherein the Impact Analysis category contains a list of entities, connections, and sites that are affected by a problem related to a trouble ticket, wherein the Diagnostic branch includes at least one of a list of test results and a measure of progress for a test, and wherein the History of Configuration Changes category includes a log of changes made to a configuration of one or more routers in the network.

10. The method of claim 1, wherein updating the multi-dimensional graph to reflect changes in the data further comprising adjusting the appearance of the at least one branch using at least one of: (i) highlighting at least a portion of the at least one branch, (ii) changing a color of the at least one branch, (iii) changing a size of the at least one branch, and (iv) changing a font used within the at least one branch.

11. The method of claim 1, wherein at least one of the branches includes an indication that additional data related to the corresponding one of the at least two different categories is not yet available, wherein the indication comprises at least one of: (i) a status bar showing a progress of a test associated with the corresponding category, (ii) a series of question marks, and (iii) an hour glass.

12. A non-transitory computer-readable medium containing a program that, when executed by operation of one or more computer processors, performs an operation to:
receive data related to a problem reported for a network, the data including at least two different categories of data;
displaying representations of the at least two different categories of data as a multi-dimensional graph in a single screen of a graphical user interface, wherein each of the categories of data is represented in the multi-dimensional graph by a respective branch, wherein each branch is given a respective weight based, at least in part, on a number of data elements within the category associated with the branch, wherein the respective weight given to each of the branches is further based on a determination of whether the number of data elements exceeds a predefined threshold amount of data elements corresponding to the category associated with the branch, such that the respective weight of each branch is further increased if the corresponding predefined threshold amount of data elements is exceeded, and wherein the branches are positioned in a vertical hierarchy within the multi-dimensional graph relative to one other based on the respective weight for each branch, such that the greater the respective weight, the lower the relative position of the branch; and
updating the multi-dimensional graph to reflect changes in the data, wherein the position of at least one of the branches is altered so as to convey an updated relative importance of the branch, based on an updated weight for the branch, the updated weight based on an updated number of data elements within the category associated with the branch.

13. The non-transitory computer-readable medium of claim 12, the operation further comprising:
display a representation of data of a first category as a first branch portion of the graph; and
display a representation of data of a second category as a second branch portion of the graph.

14. The non-transitory computer-readable medium of claim 12, wherein dynamically updating the multi-dimensional graph to reflect changes in the data further comprises:
adjusting a size of one or more attributes of a first one of the branches in the multi-dimensional graph, based on the amount of data in the corresponding category, wherein the size of the first branch is further based on a determination of whether the number of data elements within a first category of the at least two different categories of data associated with the first branch exceeds a respective predefined threshold amount of data elements corresponding to the first category, such that the first branch is displayed at an enlarged size if the corresponding predefined threshold amount of data elements is exceeded.

15. The non-transitory computer-readable medium of claim 12, wherein at least one of the categories of data comprises impact analysis data received from a probe deployed on a device in the network.

16. The non-transitory computer-readable medium of claim 12, wherein displaying representations of the two different categories of data further comprises:
displaying an indication of a number of data elements in at least one of the categories; and
allowing expansion of a category to display a plurality of the data elements in the at least one of the categories.

17. The non-transitory computer-readable medium of claim 12, the operation further comprising:

allow a user to toggle between a view of the data as the multi-dimensional graph in a single screen and a tabbed view with categories of data displayed in separate tabs.

18. The non-transitory computer-readable medium of claim 12, wherein the respective weight is further based on the category associated with the branch, so that each branch is positioned relative to the other branches in the multi-dimensional graph according to their respective weight based on the category associated with the branch and the number of data elements within the category associated with the branch.

19. A network management system, comprising:
  logic for receiving data related to a problem reported for a network, the data including at least two different categories of data;
  logic for displaying representations of the at least two different categories of data as a multi-dimensional graph in a single screen of a graphical user interface, wherein each of the categories of data is represented in the multi-dimensional graph by a respective branch, wherein each branch is given a respective weight based, at least in part, on a number of data elements within the category associated with the branch, wherein the respective weight given to each of the branches is further based on a determination of whether the number of data elements exceeds a predefined threshold amount of data elements corresponding to the category associated with the branch, such that the respective weight of each branch is further increased if the corresponding predefined threshold amount of data elements is exceeded, and wherein the branches are positioned in a vertical hierarchy within the multi-dimensional graph relative to one other based on the respective weight for each branch, such that the greater the respective weight, the lower the relative position of the branch; and
  logic for updating the multi-dimensional graph to reflect changes in the data, wherein the position of at least one of the branches is altered so as to convey an updated relative importance of the branch, based on an updated weight for the branch, the updated weight based on an updated number of data elements within the category associated with the branch.

20. The network management system of claim 19, wherein the logic for displaying the two different categories of data as a multi-dimensional graph is configured to:
  display a representation of data of a first category as a first branch portion of the graph; and
  display a representation of data of a second category as a second branch portion of the graph.

21. The network management system of claim 19, wherein the logic for receiving data related to a problem reported for a network is configured to receive data from one or more probes deployed on one or more devices in the network.

22. The network management system of claim 19, further comprising logic allowing a user to toggle between a view of the data as the multi-dimensional graph in a single screen and a tabbed view with categories of data displayed in separate tabs.

23. The network management system of claim 19, wherein the respective weight is further based on the category associated with the branch, so that each branch is positioned relative to the other branches in the multi-dimensional graph according to their respective weight based on the category associated with the branch and the number of data elements within the category associated with the branch.

* * * * *